(12) United States Patent
Cantonetti et al.

(10) Patent No.: US 8,367,758 B2
(45) Date of Patent: Feb. 5, 2013

(54) WATER-BASED CEMENT FOR PRODUCING TYRES

(75) Inventors: Veronica Cantonetti, Rome (IT); Salvatore Cotugno, Rome (IT)

(73) Assignee: Bridgestone Corporation, Tokyo (JP)

( * ) Notice: Subject to any disclaimer, the term of this patent is extended or adjusted under 35 U.S.C. 154(b) by 866 days.

(21) Appl. No.: 12/101,307

(22) Filed: Apr. 11, 2008

(65) Prior Publication Data

US 2008/0251180 A1 Oct. 16, 2008

(30) Foreign Application Priority Data

Apr. 13, 2007 (IT) .............. TO2007A0261

(51) Int. Cl.
*C08K 3/30* (2006.01)
*B60C 1/00* (2006.01)

(52) U.S. Cl. ...................... 524/418; 152/565

(58) Field of Classification Search ............. 524/418
See application file for complete search history.

(56) References Cited

U.S. PATENT DOCUMENTS

| | | | | |
|---|---|---|---|---|
| 3,467,563 A | * | 9/1969 | Mason | 156/72 |
| 3,849,363 A | * | 11/1974 | Maass et al. | 524/442 |
| 7,662,890 B2 | * | 2/2010 | Aida et al. | 525/332.5 |

FOREIGN PATENT DOCUMENTS

| | | |
|---|---|---|
| EP | 1 731 562 A1 | 12/2006 |
| GB | 1126834 A | 9/1968 |
| JP | 59-138282 A | 8/1984 |
| JP | 2000044735 | * 2/2000 |

OTHER PUBLICATIONS

Kautschuk-Lexikon, 2.Auflage, 1977.*
Translation of JP 2004044735, Feb. 2000.*
K.F. Heinisch: "Kautschuk-Lexikon, 2.Auflage", 1977, Gentner Verlag, Stuttgart, XP002487209, p. 284, p. 273.
European Search Report for EP 08 15 4453 dated Jul. 7, 2008.
Japanese Office Action issued in corresponding patent application No. 2008-103278 dated May 29, 2012.

* cited by examiner

*Primary Examiner* — Hui Chin
(74) *Attorney, Agent, or Firm* — Sughrue Mion, PLLC

(57) ABSTRACT

A water-based cement for producing tyres includes 5 to 80% by weight of water, 10 to 60% by weight of a cross-linkable unsaturated-chain polymer base, 1 to 15% by weight of emulsifiers, and a quantity of metal oxide depending on the desired degree of adhesion.

2 Claims, No Drawings

WATER-BASED CEMENT FOR PRODUCING TYRES

The present invention relates to a water-based cement for producing tyres.

BACKGROUND OF THE INVENTION

In tyre manufacturing, cements are normally organic-solvent-based. Cements of this sort are highly adhesive and easy to use, mainly on account of rubber dissolving readily in organic solvents and so blending with other rubber to form practically one piece once the organic solvent evaporates.

This type of cement has the major drawback of containing a large amount of organic solvent, which, as is known, is highly volatile, and constitutes a hazard both to the environment and, above all, to the health of workers coming into contact with it. Moreover, on evaporating, solvents form potentially explosive mixtures with air.

For all these reasons, recent European directives have imposed a drastic reduction in the use of organic solvents in tyre manufacturing, thus forcing manufacturers to devise alternative solutions to ensure correct adhesion of rubber layers.

A need is therefore felt within the tyre industry for non-organic-solvent cements capable of ensuring adequate adhesion of the various rubber tyre component parts.

SUMMARY OF THE INVENTION

According to the present invention, there is provided a water-based cement for producing tyres, comprising 5 to 80% by weight of water, 10 to 60% by weight of a cross-linkable unsaturated-chain polymer base, and 1 to 15% by weight of emulsifiers; said cement being characterized by comprising a quantity of metal oxide depending on the desired degree of adhesion; and said metal oxide being in the group comprising $TiO_2$, $MgO$, $Al_2O_3$, $ZrO_2$, $CoO_3$, $Fe_2O_3$, $CaO$, $CuO$, $CuO_2$, $MnO_2$, $PbO$, $WO_3$, $Cr_2O_3$, $K_2O_3$, $V_2O_5$, $VO_2$, $NiO$, $CrO_2$, $SiO_2$.

The quantity of metal oxide preferably ranges between 0.1 and 15% by weight.

The polymer base is preferably natural rubber, styrene-butadiene, butadiene, isoprene-isobutene copolymers, possibly halogenated.

The cement preferably comprises 0.2 to 1% by weight of sulphur, and 1 to 25% by weight of reinforcing filler.

The reinforcing filler is preferably carbon black and/or silica.

DETAILED DESCRIPTION OF THE INVENTION

The following are purely non-limiting examples, for a clearer understanding of the invention.

EXAMPLES

Three cements (A, B, C) were prepared according to the present invention, using different quantities of $TiO_2$.

As will be clear to an expert, in addition to natural rubber, the cements according to the present invention may comprise any cross-linkable unsaturated-chain polymer base obtained by polymerizing conjugate dienes and/or aliphatic or aromatic vinyl monomers. For example, the polymer bases that can be used are chosen from the group comprising natural rubber, 1,4-cis polyisoprene, butadiene, isoprene-isobutene copolymers, possibly halogenated, butadiene-acrylonitrile, styrene-butadiene, and styrene-butadiene-isoprene terpolymers, in solution or emulsion, and ethylene-propylene-diene terpolymers. These polymer bases may be used individually or mixed.

To better assess the advantages of the invention, two comparison cements were prepared: a first (D) is a known organic-solvent-based cement; and a second (E) has the same composition as the present invention, but with no $TiO_2$.

The cements according to the invention and the comparison cements were adhesion tested on both green and cured rubber.

Table I shows the compositions, expressed in percentages by weight, of the cements according to the invention.

TABLE I

|  | A | B | C |
|---|---|---|---|
| WATER | 50.0 | 50.0 | 50.0 |
| NATURAL RUBBER | 25.0 | 25.0 | 25.0 |
| CARBON BLACK | 13.0 | 13.0 | 13.0 |
| ZINC OXIDE | 1.0 | 1.0 | 1.0 |
| TITANIUM DIOXIDE | 1.0 | 2.0 | 3.0 |
| SULPHUR | 0.5 | 0.5 | 0.5 |
| SULPHONAMIDE | 0.5 | 0.5 | 0.5 |
| EMULSIFIERS | 5.0 | 5.0 | 4.8 |

Table II shows the compositions, expressed in percentages by weight, of the comparison cements.

TABLE II

|  | D | E |
|---|---|---|
| WATER | — | 50.0 |
| HEPTANE | 70.0 | — |
| NATURAL RUBBER | 18.0 | 25.0 |
| CARBON BLACK | 9.0 | 13.0 |
| STEARIC ACID | 0.6 | — |
| ZINC OXIDE | 0.3 | 1.0 |
| SULPHUR | 0.3 | 0.5 |
| SULPHONAMIDE | 0.3 | 0.5 |
| EMULSIFIERS | — | 5.0 |

The cements were prepared using known standard techniques.

Laboratory Tests

Each cement was tested on both green and cured rubber. Table III shows the adhesion test results as per ASTM Standard D1876.

Each cement was also tested for rheometric properties as per ASTM Standard D5289, and viscosity tested as per ASTM Standard D6080. The results are shown in Table III.

TABLE III

|  | A | B | C | D | E |
|---|---|---|---|---|---|
| Viscosity (cps) | 100 | 100 | 100 | 100 | 100 |
| ML (dNm) | 3.4 | 3.4 | 3.5 | 1.3 | 3.9 |
| MH (dNm) | 13.5 | 14.3 | 15.0 | 14.8 | 10.8 |
| T10 | 0.3 | 0.3 | 0.3 | 0.5 | 0.3 |
| T50 | 0.80 | 0.80 | 0.80 | 1.10 | 0.80 |
| T90 | 2.30 | 2.35 | 2.35 | 3.00 | 2.30 |
| Green-rubber adhesion (N/mm) | 1.50 | 1.50 | 1.50 | 2.00 | 0.50 |
| Cured-rubber adhesion* (N/mm) | 18.00 | 20.00 | 21.50 | 20.00 | 10.00 |

*The cured rubber was obtained as per ASTM Standard 1382, by curing for 10 minutes at a constant temperature of 160° C.

As shown in Table III, the water-based cements according to the present invention provide for excellent adhesion, even superior to that of organic-solvent-based types, with substantially no change in viscosity and rheometric characteristics.

The invention claimed is:

1. A tire adhesive, comprising 5 to 80% by weight of water; 10 to 60% by weight of a cross-linkable unsaturated-chain polymer base selected from the group consisting of natural rubber, styrene-butadiene, butadiene, isoprene-isobutene copolymers, optionally halogenated; 1 to 15% by weight of emulsifiers; and 0.2 to 1% by weight of sulphur; wherein said tire adhesive comprises a combination of 1 to 25% by weight of carbon black and 0.1 to 15% by weight of $TiO_2$.

2. A method for producing tires comprising employing the tire adhesive as claimed in claim 1 to glue separate parts of the tire together.

* * * * *